Patented Nov. 22, 1938

2,137,370

UNITED STATES PATENT OFFICE 2,137,370

METHOD OF COATING IRON AND STEEL SURFACES

Theodor Broch Unger, Fredriksstad, Norway

No Drawing. Application December 5, 1936, Serial No. 114,503. In Great Britain December 11, 1935

1 Claim. (Cl. 148—6.5)

This invention has for its object a method of treatment of iron and steel structures to provide same with a protective coating capable of resisting the corroding effects of liquids and gases and which is also particularly well suited to serve as an undercoating for paints, varnishes, lacquers and the like.

This invention is a continuation in part of my prior application Ser. No. 19,117 filed on April 30, 1935 for a Method of providing iron and steel structures with a protective coating.

According to the invention the results aimed at are attained by applying to the surfaces in question an aqueous paste comprising a compound of a metal which is above iron in the electromotive series of the metals together with a compound capable of forming complex compounds with iron.

When a composition of this character is maintained in contact with the iron surface for some time, iron ions will enter into solution and form a complex iron compound, while the metal above iron in the electromotive series will be deposited on the iron surface in a metallic condition (by "cementation").

The metal above iron in the electromotive series which is a necessary constituent of the composition may be for example zinc, chromium, magnesium or any other metal below magnesium in the electromotive series. This metal may be present in the composition as a salt or as an oxide or as a mixture of both.

The compound capable of forming complex compounds with iron may for example be a phosphate such as monocalcium phosphate or a tartrate (such as sodium or potassium tartrate) or an acetate (such as sodium or potassium acetate) or the like. In addition to the said substances the composition preferably also contains an alkali metal salt or other good electrolyte.

In order to produce a suitable consistency to make the composition readily applicable by brushing, spraying or like methods, the composition will usually be given an addition of some filler such as kieselguhr, clay, starch or the like.

In order to produce a protective coating on the iron or steel surface in question, a coating of a composition of the above specified nature is applied to the surface and then left to solidify, whereupon a suitable paint, lacquer, varnish, oil or the like is applied on top of the first coating.

The resulting compound coating adheres very strongly to the surface and protects the surfaces for a very long time.

The method is of particular advantage in connection with ships and constructional equipment of ships, ship tanks and other large containers on board ships or on the land, comprising also steam boilers, pipe lines and the like; but the use of the method is of advantage also in connection with other iron and steel structures, such as buildings, bridges, masts, pillars, posts and the like.

The paint, lacquer or the like applied as the second coating on top of the solidified layer of aqueous composition may be an ordinary paint containing fillers or pigments of any suitable nature, such as for example chalk, zinc white, lithophone etc. It has been found, however, that titanium compounds, such as titanium dioxide are particularly suitable as a filler or pigment in the second coating composition.

The ordinary commercial titanium paints (containing titanium oxide with or without other pigments or fillers such as zinc white, lithophone, chalk etc.) have proved to give excellent results in combination with the above specified grounding composition.

Example I

An iron structure with a surface area of 450 square meters was in a rusty condition brushed over with 200 kg. in total of a paste consisting of:

| | Parts by weight |
|---|---|
| Zinc oxide | 12.5 |
| Mono-calcium phosphate | 72 |
| Dextrine | 4 |
| Water | 75 |

The coating solidified in the course of 24 hours. On top of the so obtained coating, a layer of an oil paint containing titanium pigment was applied. The structure was maintained in contact with sea water for more than 3 months. No formation of rust could be detected as a result of this. The effect of the treatment may be explained as follows:

The zinc oxide and a part of the mono-calcium phosphate react to form a zinc phosphate and tricalcium phosphate. The excess of mono-calcium phosphate reacts with iron and rust to form insoluble iron phosphate. At the same time metallic zinc is deposited on the iron. A saturated solution of zinc phosphate is in fact present together with a compound capable of forming a complex salt. This compound combines with the iron (equivalent to the deposited zinc) which will enter into solution. The coating of paste further acts as a constant store for further reaction as above in proportion as a part of the coating is dissolved in water, and forms a comparatively saturated solution reacting as above explained. There is thus constantly a direction of flow which brings about deposition of metallic zinc.

Example II

An iron surface was coated with a paste containing zinc chloride, mono-calcium phosphate and kieselguhr. The paste consisted of:

| | Parts by weight |
|---|---|
| Zinc chloride | 25 |
| Calcium monophosphate ($CaH_4(PO_4)_2$) | 60 |
| Kieselguhr | 30 |
| Water | 20 |

The paste was prepared by the aid of sea water as a vehicle. The coating was left to dry and was then coated with a layer of an oil paint.

Example III

An iron tank, which after emptying has been brushed to remove loose rust, is brushed over (one time or several times) with a paste, produced by stirring 10 parts by weight of zinc chloride and 20 parts by weight of potassium tartrate in about 170 parts by weight of water. When dry the resulting coating was covered by a layer of an oil paint.

Example IV

A number of iron plates was brushed over with various pastes of the above type, some containing zinc phosphate and others containing zinc oxide, but having as a constituent instead of monocalcium phosphate various other phosphates such as phosphates of aluminium, titanium, magnesium, strontium, and barium. These pastes were found to have the same effect as set forth in the above examples.

The pastes above mentioned were also employed to coat iron surfaces of large dimension, which had previously been freed from loosely adhering rust. After the paste coating had solidified the surfaces were treated as usual with one or two coats of paint. It was found that on this support the paint produced a very keeping coating.

In the course of the various experiments it has been found that the paste functions as a satisfactory substitute for the conventional base coat of red lead.

Example V

A large new iron plate with roller scales was cut into comparatively large pieces. Two of the pieces were painted with one coat of ordinary red lead. When this coat was dry, two coats of ordinary painters oil with titanium white (Standard A) were applied. One of the samples was immersed with one half in sea water. The other sample was placed in open air in an oblique position.

Two other pieces of the plate were coated with a paste consisting of 12.5 parts of zinc chloride, 72 parts of monocalcium phosphate (commercial quality), 4 parts of dextrine and 75 parts of water. After drying, two coats of the same titanium white-oil paint as above were applied. One of these samples was placed half immersed in sea water, and the other one in open air in an oblique position. After four months, both of the samples in open air were found to be in good condition, while the red lead-coated sample immersed in sea water was found to be highly damaged. The other sample placed in sea water was in an entirely sound condition.

Example VI

A large iron plate in a thoroughly rusty condition was freed from loosely adhering rust by beating and then cut into pieces and treated exactly as in Example V. After about four months the samples were inspected. The results were exactly as in Example V with the only difference that the red lead sample in sea water was found to be in a still more damaged condition than according to Example V.

Example VII

An iron plate (scrap iron) having large rust cavities was freed from loosely adhering rust, while the main part of the rust was left on the plate. The plate was cut into pieces, and the pieces treated as in Example V. After four months the samples were inspected. The red lead sample in open air showed a beginning deterioration, in that the rust spots had penetrated through the paint. The other open air sample was in an entirely sound condition. The red lead sample in sea water was highly damaged, large blisters having been formed on the surface. The other sample, treated with the aqueous paste and placed in sea water showed no signs of deterioration.

Example VIII

A ship's hull was coated with a paste of the same composition as in Example V. After some days the surface below the water line was coated with an ordinary bottom paint. Above the water line a grey oil paint was applied. Part of the work was done at temperatures of about 8° C. below zero, while the rest of the work was done at temperatures above zero in moist air. After eight months, the surface was in an entirely sound condition with no signs of rust.

I claim:

Method of protecting iron and steel structures against corrosion which comprises preparing an aqueous zinc depositing paste by incorporating zinc oxide and monocalcium phosphate into an aqueous liquid, applying a coating of the so prepared aqueous paste to the iron surface to be protected, and leaving the so applied coating on the iron surface in a moist condition at ordinary temperature until the coating has solidified.

THEODOR BROCH UNGER.